United States Patent
Sasaki et al.

(10) Patent No.: US 7,388,037 B2
(45) Date of Patent: Jun. 17, 2008

(54) LOW-RESILIENCE FLEXIBLE POLYURETHANE FOAM AND PROCESS FOR PRODUCING THE SAME

(75) Inventors: Takayuki Sasaki, Ibaraki (JP); Yuuji Kimura, Ibaraki (JP); Katsuji Kuribayashi, Ibaraki (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/385,933

(22) Filed: Mar. 22, 2006

(65) Prior Publication Data

US 2006/0160912 A1    Jul. 20, 2006

Related U.S. Application Data

(63) Continuation of application No. 10/869,931, filed on Jun. 18, 2004, which is a continuation of application No. PCT/JP02/013315, filed on Dec. 19, 2002.

(30) Foreign Application Priority Data

| Dec. 21, 2001 | (JP) | ............................. 2001-388952 |
| Dec. 25, 2001 | (JP) | ............................. 2001-392354 |

(51) Int. Cl.
C08G 18/28    (2006.01)
(52) U.S. Cl. .................. 521/174; 521/124; 521/130; 521/131; 521/170
(58) Field of Classification Search ............... 521/170, 521/174, 124, 130, 131
See application file for complete search history.

(56) References Cited

U.S. PATENT DOCUMENTS

| 5,093,380 A | 3/1992 | Takeyasu et al. |
| 5,100,922 A | 3/1992 | Wada et al. |
| 5,437,822 A | 8/1995 | Wada et al. |
| 5,648,559 A | 7/1997 | Hager |
| 6,136,879 A | 10/2000 | Nishida et al. |
| 6,204,300 B1 | 3/2001 | Kageoka et al. |
| 6,313,060 B1 | 11/2001 | Sugiyama et al. |
| 6,653,362 B2 | 11/2003 | Toyota et al. |
| 6,734,219 B2 | 5/2004 | Wada et al. |
| 6,756,415 B2 | 6/2004 | Kimura et al. |
| 6,759,448 B2 | 7/2004 | Toyota et al. |
| 6,815,467 B2 | 11/2004 | Toyota et al. |
| 2004/0152797 A1 | 8/2004 | Wada et al. |
| 2004/0229970 A1 | 11/2004 | Sasaki et al. |
| 2006/0160912 A1 | 7/2006 | Sasaki et al. |

FOREIGN PATENT DOCUMENTS

| EP | 0913414 A1 | 5/1999 |
| EP | 0934962 A1 | 8/1999 |
| EP | 1 022 300 A1 | 7/2000 |
| EP | 1022300 A1 | 7/2000 |
| EP | 1 316 571 A1 | 6/2003 |
| EP | 1 316 573 A1 | 6/2003 |
| JP | 54-162794 | 12/1979 |
| JP | 9-124764 | 5/1997 |
| JP | 11-60676 | 3/1999 |
| JP | 11-130833 | 5/1999 |
| JP | 11-286566 | 10/1999 |
| JP | 2001-311482 | 11/2001 |
| JP | 2003-119236 | 4/2003 |
| WO | WO 01/32736 | 5/2001 |

OTHER PUBLICATIONS

U.S. Appl. No. 11/431,818, filed May 11, 2006, Sasaki et al.
U.S. Appl. No. 11/385,933, filed Mar. 22, 2006, Sasaki et al.
U.S. Appl. No. 11/385,933, filed Mar. 22, 2006, Sasaki et al.
U.S. Appl. No. 11/375,012, filed Mar. 15, 2006, Sasaki et al.
esp@cenet—English Abstract of JP11286566.
Patent Abstracts of Japan—English Abstract of JP 09-124764.
esp@cenet—English Abstract of JP 11-130833.
Patent Abstracts of Japan—English Abstract of JP 11-060676.
Japanese Industrial Standard; JIS K 6400: 1997; Test methods for flexible polyurethane foam; Ref. No. JIS K 6400:1997 (E); pp. 12-14.
U.S. Appl. No. 11/752,600, filed May 23, 2007, Sasaki et al.
U.S. Appl. No. 11/749,994, filed May 17, 2007, Kimura et al.
U.S. Appl. No. 11/876,237 filed Oct. 22, 2007, Sasaki et al.
U.S. Appl. No. 11/944,002 filed Nov. 21, 2007, Sasaki et al.
U.S. Appl. No. 11/944,730 filed Nov. 26, 2007, Sasaki et al.
U.S. Appl. No. 11/944,665 filed Nov. 26, 2007, Sasaki et al.
U.S. Appl. No. 11/944,799 filed Nov. 26, 2007, Sasaki et al.

*Primary Examiner*—John M. Cooney, Jr.
(74) *Attorney, Agent, or Firm*—Oblon, Spivak, McClelland, Maier & Neustadt, P.C.

(57) ABSTRACT

A flexible polyurethane foam whereby exceedingly low resilience can be obtained without using a plasticizer and the hardness change due to a temperature change is little; and a process for its production, are provided. The flexible polyurethane foam is characterized by having a core resilience of 30% or lower and a glass transition point within a range of from −80° C. to −60° C. The process for producing a flexible polyurethane foam comprises reacting a polyol with a polyisocyanate compound in the presence of a catalyst, a foam stabilizer, and a blowing agent, and is characterized by using as the polyol a polyol(1) having a hydroxyl value of from 5 to 15 mgKOH/g.

10 Claims, No Drawings

LOW-RESILIENCE FLEXIBLE POLYURETHANE FOAM AND PROCESS FOR PRODUCING THE SAME

TECHNICAL FIELD

The present invention relates to a low resilience flexible polyurethane foam using a high-molecular weight polyol having a low hydroxyl value, and a process for producing the same.

BACKGROUND ART

Heretofore, a flexible polyurethane foam (hereinafter referred to as a flexible foam) having a low impact resilience, namely, of low resilence is used as a shock-absorbing body, a sound-absorbing body or a vibration-absorbing body. Further, it is known that when such a foam is used for a cushion material of a chair or for a mattress, body pressure distribution becomes uniform, whereby fatigue feeling and a decubitus can be relieved. For example, a flexible foam of low resilence is disclosed in JP-A-11-286566 is known.

The above document discloses a flexible foam of low resilience, which can be obtained by reacting a urethane foam composition comprising a polyol (a), a polyisocyanate (b), a catalyst (c) and a blowing agent (d), and which has at least one glass transition point within each of a temperature range of from −70° C. to −20° C. and a temperature range of from 0° C. to 60° C., such that when the above glass transition point is represented by a peak value of tan δ obtained by measurement of the dynamic viscoelasticity at a frequency of 10 Hz, the peak value of tan δ within the temperature range of from −70° C. to −20° C. is at least 0.15 and the peak value of tan δ within the temperature range of from 0° C. to 60° C. is at least 0.3.

In this prior art, in order to obtain a flexible foam of low resilience, which is excellent in low resilience at room temperature and shows little increase of hardness at a low temperature, a polyol (a-1) having an average number of functional groups of from 1.5 to 4.5 and a hydroxyl value of from 20 to 70 mgKOH/g and a polyol (a-2) having an average number of functional groups of from 1.5 to 4.5 and a hydroxyl value of from 140 to 300 mgKOH/g are used as the polyol (a), and from 32 to 80 wt % of (a-1) and from 20 to 68 wt % of (a-2) are blended for use. Thus, a flexible foam having at least one glass transition point within each of a temperature range of from −70° C. to −20° C., preferably from −50° C. to −25° C., and a temperature range of from 0° C. to 60° C., preferably from 30° C. to 55° C., is formed.

However, in a method for blending at least two kinds of specific polyols having different hydroxyl values to form a flexible foam as in the above prior art, there was a problem that a hardness change due to a temperature change could not be sufficiently controlled. Further, in recent years, a level of durability required for a flexible foam has been raised. And further, it has been desired to further lower the impact resilience (in Examples of the above document, the impact resilience is somewhat high at a level of from 5 to 18%) to develop a low-resilience where the impact resilience is approximately 0.

The resilience (the impact resilience) of an urethane foam can be usually reduced by blending a plasticizer in a flexible foam, and by adding a proper amount of the plasticizer, a flexible foam having a certain degree of desirable low resilience can be obtained. However, in use, there is a possibility that the added plasticizer is volatilized and absorbed in a human body, and thus, a substance harmful to a human body can not be used. Further, a plasticizer was likely to elute during washing of the foam, whereby it was difficult to maintain the low-resilience of the foam after it was washed repeatedly.

The present invention has been made under these circumstances, and it is an object of the present invention to provide a flexible polyurethane foam, which is excellent in durability, and whereby an excellent low-resilience is obtainable without using a plasticizer, and the hardness change due to a temperature change is little, and a process for producing the same.

DISCLOSURE OF THE INVENTION

In order to achieve the above object, the present invention provides the following flexible polyurethane foam and a process for producing the flexible polyurethane foam.

(I) A flexible polyurethane foam characterized by having a core impact resilience of at most 30% and a glass transition point of from −80° C. to −60° C. Here, the flexible polyurethane foam preferably has a hard segment content of at most 40 mass %

(II) A process for producing a flexible polyurethane foam, which comprises reacting a polyol with a polyisocyanate compound in the presence of a catalyst, a foam stabilizer and a blowing agent, characterized in that said polyol, a polyol (1) having a hydroxyl value of from 5 to 15 mgKOH/g, is used to produce the flexible polyurethane foam as defined in (I). Here, the polyol (1) is preferably a polyoxyalkylene polyol obtained by ring-opening addition polymerization of an alkylene oxide by means of a double metal cyanide complex catalyst. Further, the polyol (1) is preferably a polyoxyalkylene polyol having an oxyalkylene random-chain formed by means of a double metal cyanide complex catalyst.

(III) A flexible polyurethane foam characterized by having a core impact resilience of at most 3% and glass transition points within ranges of from −80° C. to −60° C. and from −20° C. to lower than 0° C.

(IV) A process for producing a flexible polyurethane foam, which comprises reacting a polyol with a polyisocyanate compound in the presence of a catalyst, a foam stabilizer and a blowing agent, characterized in that said polyol, a polyol mixture is used which comprises a polyol (1) having a hydroxyl value of from 5 to 15 mgKOH/g and a polyol (2) having a hydroxyl value of from 40 to 250 mgKOH/g, to produce the flexible polyurethane foam according to (III). Here, the polyol (1) is preferably a polyoxyalkylene polyol obtained by ring-opening addition polymerization of an alkylene oxide by means of a double metal cyanide complex catalyst. Further, the mixed mass ratio of the polyol (1) to the polyol (2) in said polyol mixture is (1):(2)=50:50 to 75:25.

BEST MODE FOR CARRYING OUT THE INVENTION

Flexible Foam

The flexible foam of the present invention is a flexible foam having a low resilience. Namely, the flexible foam as defined in the above (I) (hereinafter referred to as the flexible foam (I), and in accordance with this, reference terms such as the flexible foam (III), the production process (II) and the production process (IV) will be used.) is characterized by having a core impact resilience of at most 30%. Further, the flexible foam (III) is characterized by having a core impact resilience of at most 3%. The measurement of the core impact resilience was carried out by a method in accordance with JIS K6400. Here, the core represents the core portion having the skin portion removed from a flexible foam sample so as to eliminate an influence of the skin portion.

The flexible foam of the present invention is a flexible foam having a low impact resilience, and it is suitable as a shock-absorbing body, a sound-absorbing body or a vibration-absorbing body, and also suitable for a bedclothing, a mattress, a cushion or a sheet for a seat.

Further, the flexible foams (I) and (III) of the present invention are characterized by having a glass transition point within a range of from −80° C. to −60° C. Further, the measurement of the glass transition point was carried out by a method in accordance with JIS K7244. Namely, in a nitrogen atmosphere, while the temperature was raised at a heating rate of 3° C./min, the dynamic viscoelasticity was measured at a frequency of 10 Hz, and an extrapolation rising temperature of the storage modulus (E') was taken as the glass transition point.

The flexible foams (I) and (III) of the present invention have a glass transition point within a range of from −80° C. to −60° C., preferably from −70° C. to −60° C. Further, in addition to this, the flexible foam (III) of the present invention has a glass transition point also within a range of from −20° C. to lower than 0° C., preferably from −10° C. to −5° C. Namely, the flexible foam (III) has a glass transition point within each range of from −80° C. to −60° C. and from −20° C. to lower than 0° C., preferably within each range of from −70° C. to −60° C. and from −10° C. to −5° C. Here, the glass transition point is based on a soft segment derived from a polyol. The glass transition point is present in a low temperature range of from −80° C. to −60° C., whereby the flexible foam of the present invention undergoes little change in the hardness even at a low temperature, and the hardness does not remarkably increase at a low temperature, such being desirable. Namely, it means that the flexibility at room temperature can be maintained even at a low temperature.

The hard segment content in the flexible foams (I) and (III) is preferably at most 40 mass %, and more preferably at most 30 mass %. The above hard segment is composed of components other than a polyol which becomes a soft segment, namely, composed of a polyisocyanate compound and water as a blowing agent. Accordingly, the hard segment content is represented by the total mass % of a polyisocyanate compound and water as a blowing agent, based on the total amount of the polyurethane resin in the produced flexible foam. However, in a case where a cross-liking agent is used in the present invention, the cross-linking agent having a molecular weight of at most 200 per a functional group is considered to be included in the hard segment. The hard segment content is adjusted to be at most 40 mass %, whereby the desired flexible foam having a low impact resilience can be produced.

Production Process

Polyol

In a process for producing a flexible polyurethane foam, which comprises reacting a polyol with a polyisocyanate compound in the presence of a catalyst, a foam stabilizer and a blowing agent, the production processes (II) and (IV) of the present invention are characterized by using a polyol (I) having a hydroxyl values of from 5 to 15 mgKOH/g, as said polyol, to produce said flexible polyurethane foam. Further, the production process (IV) of the present invention is characterized by using a polyol mixture containing a polyol (2) having a hydroxyl value of from 40 to 250 mgKOH/g and a number of functional groups of from 2 to 4 in addition to the above polyol (1). By using the above specific polyol or polyol mixture, the flexible foam of the present invention has a low impact resilience and can maintain the foam properties equal to those of under a room temperature condition, even under a low temperature condition. Namely, a flexible foam having a low impact resilience and little increase in the hardness at a low temperature, is obtainable without using a plasticizer.

The polyol (1) to be used in the present invention is a high-molecular weight polyol having a hydroxyl value of from 5 to 15 mgKOH/g. As the polyol (1) having such a low hydroxyl value, a polyoxyalkylene polyol obtainable by ring-opening addition polymerization of an alkylene oxide to an initiator is preferred. As a catalyst for this ring-opening addition polymerization, a double metal cyanide complex catalyst is desirable. Namely, as the polyol (1), one having a polyoxyalkylene chain obtainable by ring-opening addition polymerization of the alkylene oxide by using the double metal cyanide complex oxide is preferred. When the double metal cyanide complex catalyst is employed, a polyol having a low hydroxyl value and a narrow molecular-weight distribution can be produced. The polyol having a narrow molecular weight distribution has a low viscosity in comparison with a polyol having a broad molecular weight distribution in a nearly equal range of molecular weight, whereby the foam stability at the time of producing a flexible foam is improved, such being desirable.

As the above double metal cyanide complex catalyst, for example, one as disclosed in JP-B-46-27250 can be used. As a specific example, a complex containing zinc hexacyanocobaltate as the main component can be mentioned, and its ether and/or alcohol complex is preferred.

As the above ether, ethylene glycol dimethyl ether (glyme), diethylene glycol dimethyl ether (diglyme), ethylene glycol mono-tert-butyl ether (METB), ethylene glycol mono-tert-pentyl ether (METP), diethylene glycol mono-tert-butyl ether (DETB) or tripropylene glycol monomethyl ether (TPME) is, for example, preferred. Further, as the above alcohol, tert-butyl alcohol is, for example, preferred.

As the above alkylene oxide, ethylene oxide, propylene oxide, 1,2-epoxybuthane or 2,3-epoxybuthane is, for example, mentioned.

The polyol (1) in the present invention preferably has an oxyalkylene random chain formed by using a double metal cyanide complex catalyst. The oxyalkylene random chain is a structure obtainable by supplying an ethylene oxide and an alkylene oxide having a carbon number of at least 3 at a prescribed ratio to a reaction system, then subjecting them to ring-opening addition polymerization randomly. As the alkylene oxide having a carbon number of at least 3, propylene oxide is preferred. Namely, the above oxyalkylene random chain is preferably an oxyethyleneoxypropylene random chain obtainable by reacting ethylene oxide and propylene oxide. The content of oxyethylene groups in the above oxyalkylene random chain is preferably from 3 to 50 mass %, more preferably from 5 to 35 mass %, particularly preferably from 15 to 30 mass %, based on the oxyalkylene random chain.

Further, the polyol (1) in the present invention preferably has a terminal oxyethylene block chain formed by using an alkali metal catalyst, at the molecular terminals. Namely, as a process for producing a polyol, at the final stage of ring-opening addition polymerization of the alkylene oxide, it is preferred that ethylene oxide is subjected to ring-opening addition polymerizing by using an alkali metal catalyst. The ratio of the terminal oxyethylene block chain, namely, the ratio of oxyethylene groups stretched at the molecular terminals is preferably from 1 to 10 mass %, more preferably from 1 to 5 mass %, to the whole polyol.

Further, the polyol (1) in the present invention preferably has the above oxyalkylene random chain and/or the above terminal oxyethylene block chain.

As an initiator to be used in the production of the above polyol (1), a compound having from 2 to 6 active hydrogen atoms in the molecule is preferred. A polyhydric alcohol such as ethylene glycol, propylene glycol, 1,4-butanediol, glycerol, trimethylol propane, pentaerythritol, diglycerol, meso-erythritol, methylglucoside, glucose or sorbitol; a phenol such as bisphenol A; an amine such as ethylenediamine, diethylenetriamine, piperazine, aminoethyl piperazine, diaminodiphenylmethane or monoethanolamine; and a condensation type compound such as phenol resin or novolac resin, may, for example, be mentioned. Among the above initiators, the polyhydric alcohol is preferred. At least two kinds of these initiators may be used together, or the initiator may be used together with an active hydrogen compound having at least 7 active hydrogen atoms, such as sucrose. Further, a compound having an alkylene oxide further ring-opening added to the above compound, may be used as an initiator.

The number of functional groups in the polyol (1) is preferably from 2 to 6, more preferably from 2.8 to 5.2. However, the number of functional groups means an average value of the number of active hydrogen atoms in an initiator. If the number of functional groups is at least 2, the problem of remarkable deterioration of the properties such as a dry heat compression set of the obtained flexible foam can be avoided. Further, by adjusting the number of functional group to at most 6, it is possible to avoid problems such as deterioration of the elongation of the obtained flexible foam or deterioration of the properties such as the tensile strength, due to an increase in the hardness.

The hydroxyl value of the polyol (1) is from 5 to 15 mgKOH/g, and more preferably from 5 to lower than 10 mgKOH/g. By using the polyol having a hydroxyl value of at most 15 mgKOH/g, a flexible foam can be produced, wherein the mechanical properties such as a tensile strength or a tear strength are excellent, and the change of properties due to a temperature change is small. Further, in a case where the hydroxyl value is less than 5 mgKOH/g, the viscosity of the polyol becomes high, whereby it is practically difficult to produce a flexible foam.

The unsaturation degree of the polyol (1) is preferably at most 0.05 meq/g, more preferably at most 0.04 meq/g. By adjusting the unsaturation degree to at most 0.05 meq/g, it is possible to avoid a drawback that the durability of the produced flexible foam deteriorates.

The polyol (2) to be used in the present invention is a polyol having a hydroxyl value of from 40 to 250 mgKOH/g and a number of functional groups of from 2 to 4. As such polyol (2), a polyoxyalkylene polyol which is obtained by ring-opening addition polymerization of the above alkylene oxide to an initiator, is desirable. As a catalyst for this ring-opening addition polymerization, a double metal cyanide complex catalyst and an alkali metal catalyst are preferred, and among them, particularly preferred is an alkali metal catalyst. As such an alkali metal catalyst, potassium hydroxide (KOH) or cesium hydroxide (CsOH), may, for example, be mentioned. As the initiator to be used in the production of the above polyol (2), a compound having from 2 to 4 active hydrogen atoms in its molecule, is used. As a specific example, among examples of the initiator to be used in the production for the polyol (1), as described above, a compound having from 2 to 4 active hydrogen atoms may be mentioned.

The number of functional groups in the polyol (2) is from 2 to 4. If the number of functional groups is at least 2, a problem of remarkable deterioration of the properties such as the dry heat compression set of the obtained flexible foam, can be avoided. Further by adjusting the number of functional groups to at most 4, it is possible to avoid a problem such that the hardness increases while the elongation of the obtained flexible foam is reduced, whereby the properties such as the tensile strength will deteriorate.

The unsaturation degree of the polyol (2) is preferably at most 0.05 meq/g, more preferably at most 0.04 meq/g. By adjusting the unsaturation degree to at most 0.05 meq/g, it is possible to avoid a drawback such that the durability of the produced flexible foam deteriorates.

In the production process (IV) of the present invention, as the polyol, a polyol mixture comprising the above polyol (1) and polyol (2), is used. The mixed mass ratio of the polyol (1) to the polyol (2) is preferably within a range of (1):(2) =from 50:50 to 75:25, more preferably from 60:40 to 70:30. By adjusting the ratio of the polyol (1) in the polyol mixture to the above range, it is possible to produce a flexible foam having a low impact resilience and showing little change in the impact resilience and hardness due to a temperature change.

In the production processes (II) and (IV), the polyol (1) or the total of the polyol (1) and the polyol (2), is preferably at least 90 mass %, more preferably at least 95 mass %, particularly preferably 100 mass %. Namely, as the above polyol, other polyol not the polyol (1) or the polyol (2),-may be contained, but the content thereof in the polyol is preferably at most 10 mass %, more preferably at most 5 mass %, and it is particularly preferably not contained at all. However, the after-mentioned crosslinking agent is not considered as the polyol. The total unsaturation degree of the above polyol (in a case where it is not solely of the polyol (1), it is the polyol mixture) is preferably at most 0.05 meq/g, more preferably at most 0.04 meq/g.

Further, as the above polyols (1), (2) and other polyol, a polymer-dispersed polyol having polymer particles stably dispersed, may be used. Here, the polymer-dispersed polyol is a dispersion system, wherein the polymer particles (dispersoid) are stably dispersed in a base polyol (dispersion medium). As the polymer of the polymer particles, an addition polymerization polymer or a condensation polymerization polymer may be mentioned. The addition polymerization polymer may, for example, be obtained by homopolymerizing or copolymerizing a monomer such as acrylonitrile, styrene, a methacrylate or an acrylate. Further, as the condensation polymerization polymer, a polyester, a polyurea, a polyurethane or a melamine may, for example, be mentioned. By presenting polymer particles in a polyol, the hydroxyl value of the polyol can be suppressed to be low, and such is effective for an improvement of the properties such as air flow of a flexible foam. Further, the content of the polymer particles in a polymer-dispersed polyol is not particularly restricted, but it is preferably at most 50 mass %, more preferably from 3 to 40 mass %. Further, in a case where the mass of a polyol is used for calculation, the mass of the polymer particles is not included.

Isocyanate

The flexible foam of the present invention is produced by reacting the above-mentioned polyol with a polyisocyanate compound in the presence of a catalyst, a foam stabilizer and a blowing agent.

The polyisocyanate compound to be used in the production processes (II) and (IV) of the present invention is not particularly restricted. For example, a polyisocyanate of an aromatic series, alicyclic series or aliphatic series; a mixture having at least two types of such a polyisocyanate; and a modified polyisocyanate obtainable by modifying it may be mentioned. As the specific example, a polyisocyanate such as tolylene diisocyanate (TDI), diphenylmethane diisocyanate (MDI), a polymethylene polyphenyl polyisocyanate (so-called crude MDI), xylylene diisocyanate (XDI), isophorone diisocyanate (IPDI) or hexamethylene diisocyanate (HMDI), or a prepolymer type modified product, an isocyanurate modified product, an urea modified product or a carbodiimide modified product thereof may, for example, be mentioned. Among them, TDI, MDI, crude MDI or a modified product thereof is preferred. Further, among them, if crude MDI or a modified product thereof (particularly preferably a prepolymer type modified product) is employed, such is preferred from the viewpoint that the foam stability will be improved or the durability will be improved.

The amount of the polyisocyanate compound is usually represented by an isocyanate index (a numerical value represented by 100 times of the number of isocyanate groups to the total number of all active hydrogen atoms in the polyol, the cross-linking agent, water, etc.), but the amount of the polyisocyanate compound in the present invention is preferably in the range of from 40 to 120, more preferably in the range of from 50 to 110, by the isocyanate index.

Urethanation Catalyst

As an urethanation catalyst for reacting the above polyol with the polyisocyanate compound, any catalyst which accelerates an urethanation reaction, may be used. A tertiary amine such as triethylenediamine, bis(2-dimethylaminoethyl)ether or N,N,N',N'-tetramethylhexamethylenediamine; a metal carboxylate such as potassium acetate or potassium 2-ethylhexanoate; and an organic metal compound such as stannous octoate or dibutyltin dilaurate, may, for example, be mentioned.

Foam Stabilizer

As the above foam stabilizer, any one which is used for producing a usual polyurethane foam may be used. A silicone-type foam stabilizer or a fluorine-type foam stabilizer may, for example, be mentioned, but particularly preferred is a silicone-type foam stabilizer. Here, the silicone-type foam stabilizer is a compound having a polysiloxane chain and a polyoxyalkylene chain. This polysiloxane chain means an organopolysiloxane chain having an organic group in the side chain, and a dimethylsiloxane chain may, for example, be mentioned as the example. Further, the polyoxyalkylene chain means the portion, wherein the same alkylene oxide as described above is added. As the addition of the alkylene oxide, a block addition in which a single alkylene oxide is added thereto, or a random addition in which at least two alkylene oxides are added randomly, may, for example, be mentioned, and these additions may be present also as mixed. The structure of this foam stabilizer may be a block type structure of a polysiloxane chain and a polyoxyalkylene chain or a structure in which a polyoxyalkylene chain is grafted as the side chain to a polysiloxane chain as the main chain. From the viewpoint of good moldability of the flexible foam, a structure is preferred in which a polyoxyalkylene chain is grafted as a side chain to a polysiloxane chain as the main chain.

As the foam stabilizer to be used in the present invention, a silicone-type foam stabilizer as defined below is most preferred. The silicone content of this foam stabilizer is preferably from 10 to 50 mass %, more preferably from 30 to 50 mass %. Here, the silicone content is the portion of the polysiloxane chain in the foam stabilizer, and the rest is a polyoxyalkylene chain. Further, as the content of ethylene oxide in the foam stabilizer, the content of an oxyethylene group in the above polyoxyalkylene chain is preferably from 70 to 100 mass %, more preferably from 90 to 100 mass %. Further, the chain length of the above polyoxyalkylene chain is preferably at most 1000, and more preferably at most 500.

Further, it is preferred that the above polyoxyalkylene chain has hydroxy groups at its terminals. However, it is not necessarily that all its terminals are hydroxy groups, and one in which a hydrogen atom of the hydroxy group is substituted with a monovalent organic group, may be included. As the proportion of the hydroxy groups in the terminals, the proportion of the hydroxy groups in all terminals of the polyoxyalkylene chain is preferably from 50 to 100 mol%, more preferably from 70 to 100 mol%, and particularly preferably 100 mol%, i.e., all of the terminals are hydroxy groups. As the above monovalent organic group, an alkyl group such as a methyl group, an ethyl group or an isopropyl group; an aryl group such as an phenyl group; and an acyl group such as an acetyl group, may, for example, be mentioned. Among them, preferred is an organic group having a carbon number of from 1 to 6.

In the process for producing a flexible foam in the present invention, two or more of the above foam stabilizers may be used together, and further, a foam stabilizer other than the above specific stabilizer may be used together. In the production of the flexible foam in the present invention, the foam stabilizer is used in an amount of preferably from 0.01 to 5 parts by mass, more preferably from 0.1 to 2 parts by mass, per 100 parts by mass of the polyol (provided that a cross-linking agent is not included).

Blowing Agent

Further, the above blowing agent is not particularly restricted, and a known blowing agent such as a fluorinated hydrocarbon may be used, but preferred is at least one selected from the group consisting of water and an inert gas. As the inert gas, specifically, air, nitrogen or carbon dioxide gas may, for example, be mentioned. Among them, water is preferred. The amount of the blowing agent is not particularly limited, but in a case where water is used, it is preferably at most 10 parts by mass, more preferably from 0.5 to 4 parts by mass, per 100 parts by mass of the polyol mixture.

Cross-Linking Agent

In the present invention, a cross-linking agent is also used as the case requires.

As the cross-linking agent, a compound having at least two functional groups having active hydrogen, such as hydroxyl groups, primary amino groups or secondary amino groups is preferred. However, in a case where a polyol compound is used as the cross-linking agent, the following is taken into account. Namely, a polyol compound having a hydroxyl value of at least 50 mgKOH/g and more than four functional groups, is considered to be the cross-linking agent, and a polyol which does not satisfy this, is considered to be any one of polyols of the above-mentioned polyol mixture (polyol (1), (2) or other polyol). Further, two or more cross-linking agents may be used together. As specific examples, a polyhydric alcohol such as dextrose, sorbitol or sucrose; a polyol having an alkylene oxide added to a polyhydric alcohol; an amine compound such as monoethanolamine, diethanolamine, ethylenediamine, 3,5-diethyl-2,4 (or 2,6)-diaminotoluene (DETDA), 2-chloro-p-phenylenediamine (CPA), 3,5-bis(methylthio)-2,4 (or 2,6)-diaminotoluene, 1-trifluoromethyl-4-chloro-3,5-diaminobenzene, 2,4-toluenediamine, 2,6-toluenediamine, bis(3,5-dimethyl-4-aminophenyl)methane, 4,4'-diaminodiphenylmethane, m-xylylenediamine, 1,4-diaminohexane, 1,3-bis(aminomethyl)cyclohexane or isophoronediamine; and a compound obtained by adding an alkylene oxide thereto, may, for example, be mentioned.

When the above cross-linking agent is used, even in a case where, for example, a large amount of a blowing agent is used to produce a flexible foam having a low density, the foaming stability will be good, and it will be possible to produce such a flexible foam. Especially when a polyol having a high-molecular weight is used, it is possible to produce a flexible foam having a low density which used to be considered difficult to foam. Further, when the cross-linking agent is used, the durability will be improved, as compared with a case where it is not used. In a case where a polyol having a high-molecular weight is used as in the present invention, the foaming stability can readily be improved particularly when a compound having a relatively high-molecular weight, such as a molecular weight of at least 4000, is used.

Other Auxiliary Agent

In the process for producing a flexible foam of the present invention, optional additives may further be used other than the above-mentioned catalyst, blowing agent, foam stabilizer and the cross-linking agent. As such additives, a bulking agent such as potassium carbonate or barium sulfate; a surface active agent such as an emulsifier; an anti-aging agent such as an anti-oxidant or an ultraviolet absorber; a fire retardant; a plasticizer; a coloring agent; an anti-mold agent; a foam breaker; a dispersant; and an anti-discoloring agent, may, for example, be mentioned.

Foaming Method

The method for forming the flexible foam of the present invention may be either a method (molding method) of injecting a reactive mixture into a sealed mold, fooled by foaming and molding, or a method (slab method) of foaming a reactive mixture in an open system, but the slab method is preferred. Specifically, a known method such as a one-shot method, a semi-prepolymer method or a prepolymer method may be employed. For producing a polyurethane, a production apparatus which is commonly used, may be used.

EXAMPLES

Now, the present invention will be described in detail with reference to Examples, but the present invention is by no means limited thereto.

The number of functional groups, the content (mass %) of oxyethylene (EO) groups in the oxyalkylene random chain, the hydroxyl value (mgKOH/g) and the unsaturation degree (meq/g) in a polyol used in each of the following Examples 1 to 27 are shown in Table 1. The measurement of the unsaturation degree was carried out by a method in accordance with JIS K1557. "DMC-glyme" catalyst used for producing after-mentioned polyols A and B means a zinc hexacyanocobaltate-ethylene glycol dimethyl ether complex catalyst, and "KOH" catalyst used for producing polyols C to H means a potassium hydroxide catalyst.

Production of Polyol A

As an initiator, a compound having propylene oxide added to glycerol and having a hydroxyl value of 56 mgKOH/g, was used. In the presence of 3000 g of this initiator, 20400 g of an alkylene oxide mixture of propylene oxide:ethylene oxide=75:25 (mass % ratio) was reacted at about 110° C. by using a DMC-glyme catalyst, and the polymerization was completed to produce a polyol A of having hydroxyl value of 8.5 mgKOH/g and an oxyalkylene random chain of propylene oxide and ethylene oxide.

Production of Polyol B

In the presence of 3000 g of the same initiator as in the case of production of the polyol A, 26400 g of an alkylene oxide mixture of propyl oxide:ethylene oxide=85:15 (mass % ratio) was reacted at about 110° C. by using a DMC-glyme catalyst, and the polymerization was completed to produce a polyol B having a hydroxyl value of 7.0 mgKOH/g and an oxyalkylene random chain of propylene oxide and ethylene oxide.

Production of Polyol C

In the presence of 100 g of glycerol as an initiator, 3100 g of propylene oxide was reacted at about 110° C. by using a KOH catalyst. After the reaction, adsorbent (synthetic magnesium silicate) treatment and filtration were carried out to obtain a polyol C having a hydroxyl value of 56.1 mgKOH/g.

Production of Polyol D

In the presence of 100 g of glycerol as an initiator, 1080 g of propylene oxide was reacted at about 110° C. by using a KOH catalyst. After the reaction, adsorbent (synthetic magnesium silicate) treatment and filtration were carried out to obtain a polyol D having a hydroxyl value of 168.0 mgKOH/g.

Production of Polyol E

In the presence of 100 g of glycerol as an initiator, 720 g of propylene oxide was reacted at about 110° C. by using a KOH catalyst. After the reaction, adsorbent (synthetic magnesium silicate) treatment and filtration were carried out to obtain a polyol E having a hydroxyl value of 239.0 mgKOH/g.

Production of Polyol F

In the presence of 1000 g of glycerol as an initiator, 2300 g of a mixture of ethylene oxide and propylene oxide, containing 10% of the ethylene oxide, was reacted at about 110° C. by using a KOH catalyst. After the reaction, adsorbent (synthetic magnesium silicate) treatment and filtration were carried out to obtain a polyol F having a hydroxyl value of 56.1 mgKOH/g.

Production of Polyol G

In the presence of 1000 g of glycerol as an initiator, 13500 g of a mixture of ethylene oxide and propylene oxide, containing 25 mass % of the ethylene oxide, was reacted at about 110° C. by using a KOH catalyst. After the reaction, adsorbent (synthetic magnesium silicate) treatment and filtration were carried out to obtain a polyol G having a hydroxyl value of 16.8 mgKOH/g.

Production of Polyol H

In the presence of 1000 g of glycerol as an initiator, 13200 g of a mixture of ethylene oxide and propylene oxide, containing 15 mass % of the ethylene oxide, was reacted at about 110° C. by using a KOH catalyst. After the reaction, adsorbent (synthetic magnesium silicate) treatment and filtration were carried out to obtain a polyol H having a hydroxyl value of 19.1 mgKOH/g.

TABLE 1

| Polyol | Number of functional groups | EO content (mass %) in an oxyalkylene random chain | Hydroxyl value (mgKOH/g) | Unsaturation degree (meq/g) |
|---|---|---|---|---|
| A | 3 | 25 | 8.5 | 0.035 |
| B | 3 | 15 | 7.0 | 0.037 |
| C | 3 | 0 | 56.1 | 0.049 |
| D | 3 | 0 | 168.0 | 0.020 |
| E | 3 | 0 | 239.0 | 0.010 |
| F | 3 | 10 | 56.1 | 0.049 |
| G | 3 | 25 | 16.8 | 0.110 |
| H | 3 | 15 | 19.1 | 0.089 |

A flexible foam was produced by using the following materials in the blend amounts (the numerals represent parts by mass) as shown in the formulation sections in Tables 2 to 5. Here, NCO index is a value of the isocyanate index which represents the amount of the isocyanate compound used.

Cross-linking agent: In the presence of 182 g of sorbitol as an initiator, 6345 g of propylene oxide and then 300 g of ethylene oxide were reacted at about 100° C. by using a KOH catalyst. After the reaction, adsorbent treatment and filtration were carried out to obtain a polyol having a hydroxyl value of 56.0 mgKOH/g, and it was used as a cross-linking agent.

Blowing agent: Water

Catalyst a: A dipropylene glycol (DPG) solution of triethylenediamine (tradename: TEDA L-33, manufactured by Tosoh Corporation)

Catalyst b: Tin octylate (tradename: Dabco T-9, manufactured by Air Products and Chemicals, Inc.)

Foam stabilizer a: Silicone-type foam stabilizer (tradename: L-5309, manufactured by Nippon Unicar Company Limited)

Foam stabilizer b: Silicone-type foam stabilizer (tradename: L-5421, manufactured by Nippon Unicar Company Limited)

Foam stabilizer c: Silicone-type foam stabilizer (tradename: L-580, manufactured by Nippon Unicar Company Limited)

Isocyanate compound a: TDI-80 (a mixture of 2,4-TDI/2,6-TDI=80/20 mass %), content of isocyanate groups: 48.3 mass % (tradename: Coronate, manufactured by Nippon Polyurethane Industry Co., Ltd.).

Isocyanate compound b: The polyol A was reacted to TDI-80 for 3 hours at 70° C. in nitrogen atmosphere to obtain an isocyanate group terminated prepolymer (content of isocyanate groups: 45.2 mass %).

Isocyanate compound c: The polyol B was reacted to TDI-80 for 3 hours at 70° C. in nitrogen atmosphere to obtain an isocyanate group terminated prepolymer (content of isocyanate groups: 46.5 mass %).

In Examples 1 to 27, among these materials and blending agents, the mixture of all the materials other than the polyisocyanate compound (polyol system) was adjusted to a liquid temperature of 50° C.±1° C., and the polyisocyanate compound liquid was adjusted to a liquid temperature of 20±1° C., then a prescribed amount of the polyisocyanate compound was added to the polyol system, and then, 1 kg in the total amount was mixed for 5 seconds by a high speed mixer. Then, the mixture was injected into a wooden box with the top opened and the length, width and height each being 300 mm, at room temperature. The flexible foam was taken out and left to stand for more than 24 hours in a room having the temperature and humidity adjusted to room temperature (23° C.) and a humidity of 50%, and then, various properties were measured. With respect to evaluation of molding, one having no shrinkage after foaming was rated to be ○, one having a shrinkage after foaming but recovered after crushing several times was rated to be Δ, and one having a shrinkage after foaming and not recovered after crushing several times was rated to be X.

The results of the measurements are shown in Tables 2 to 5. Further, the methods for measuring the foam properties were in accordance with the following, and with respect to the core density and the core impact resilience, one cut out in a size of 100 mm in length, 100 mm in width and 50 mm in height from the center portion of the foam having the skin portion removed, was used for measurement.

Now, the standards used for the measurement of the physical properties of the flexible foam are shown.

For the core density (unit: $kg/m^3$), the 25% hardness (ILD) (23° C.) (unit: $N/314\ cm^2$), the CLD hardness (unit: $N/cm^2$), the air flow (unit: $ft^3/min$ (SI conversion: 28.3 L/min)), the core impact resilience (unit: %), the tear strength (unit: N/cm), the tensile strength (unit: kPa), the elongation (unit: %), the dry heat compression set (unit: %), and the hysteresis loss (unit: %), methods in accordance with JIS K6400 were used. The glass transition point was obtained by measuring the dynamic viscoelasticity by the method in accordance with JIS K7244. By using DMS 6100 manufactured by Seiko Instruments Inc. as the apparatus, it was measured at a frequency of 10 Hz while the temperature was raised at 3° C./min under nitrogen atmosphere. The extrapolation rising temperature of the storage resilience (E') was measured and taken as the glass transition point. One having a single glass transition point was marked down at the glass transition point 1, and with respect to one having two glass transition points, the lower glass transition point was identified as the glass transition point 1, and the other was identified as the glass transition point 2.

The core impact resilience 1 is a core impact resilience measured at room temperature (23° C.), and the core impact resilience 2 is a core impact resilience measured at a low temperature (0° C.).

Further, the CLD hardness 1 is a CLD hardness measured at room temperature (23° C.), and the CLD hardness 2 is a CLD hardness measured at a low temperature (−25° C.). The hardness ratio is a value obtained by dividing the value of the CLD hardness 2 by the value of the CLD hardness 1. If this hardness ratio is close to 1, the hardness change due to a temperature change is said to be little.

TABLE 2

| | Examples | | | | | | | |
|---|---|---|---|---|---|---|---|---|
| | 1 | 2 | 3 | 4 | 5 | 6 | 7 | 8 |
| Polyol A | 100 | 100 | 100 | 100 | — | — | — | — |
| Polyol B | — | — | — | — | 100 | 100 | 100 | 100 |

TABLE 2-continued

| | Examples | | | | | | | |
|---|---|---|---|---|---|---|---|---|
| | 1 | 2 | 3 | 4 | 5 | 6 | 7 | 8 |
| Total unsaturation degree (meq/g) | 0.035 | 0.035 | 0.035 | 0.035 | 0.037 | 0.037 | 0.037 | 0.037 |
| Cross-linking agent | — | — | — | 10 | — | 10 | 10 | 10 |
| Blowing agent | 2.0 | 2.0 | 2.0 | 2.0 | 3.0 | 3.5 | 4.0 | 5.0 |
| Catalyst a | 1.0 | 1.0 | 1.0 | 1.0 | 1.0 | 1.0 | 1.0 | 1.0 |
| Catalyst b | 0.05 | 0.05 | 0.05 | 0.05 | 0.05 | 0.08 | 0.10 | 0.15 |
| Foam stabilizer a | 0.2 | — | — | 0.2 | 0.2 | 0.2 | 0.2 | 0.2 |
| Foam stabilizer b | 1.0 | 1.2 | 1.2 | 1.0 | 1.0 | 1.0 | 1.0 | 1.0 |
| Isocyanate compound | a | b | c | a | a | a | a | a |
| NCO index | 90 | 90 | 90 | 90 | 90 | 90 | 100 | 80 |
| Hard segment (%) | 17.1 | 18.0 | 17.6 | 16.7 | 23.1 | 24.5 | 28.8 | 29.1 |
| Glass transition point 1 (° C.) | −62.1 | −63.4 | −62.4 | −61.4 | −68.1 | −67.2 | −65.5 | −65.0 |
| Glass transition point 2 (° C.) | — | — | — | — | — | — | — | — |
| Moldability | ○ | ○ | ○ | ○ | ○ | ○ | ○ | ○ |
| Core density (kg/m$^3$) | 60.1 | 66.1 | 68.1 | 58.8 | 44.3 | 41.0 | 35.9 | 30.2 |
| 25% hardness (N/314 cm$^2$) | 90 | 82 | 79 | 120 | 101 | 126 | 148 | 130 |
| CLD hardness 1 (N/cm$^2$) | 0.265 | 0.233 | 0.230 | 0.396 | 0.305 | 0.386 | 0.465 | 0.411 |
| CLD hardness 2 (N/cm$^2$) | 0.279 | 0.247 | 0.246 | 0.405 | 0.315 | 0.401 | 0.472 | 0.430 |
| Hardness ratio | 1.05 | 1.06 | 1.07 | 1.02 | 1.03 | 1.04 | 1.02 | 1.05 |
| Core impact resilience 1(%) | 21 | 23 | 24 | 25 | 19 | 21 | 25 | 19 |
| Core impact resilience 2(%) | 18 | 20 | 22 | 21 | 18 | 20 | 21 | 17 |
| Tear strength (N/cm) | 5.1 | 5.5 | 5.6 | 6.0 | 6.5 | 6.5 | 6.6 | 5.4 |
| Tensile strength (kPa) | 120 | 142 | 155 | 203 | 177 | 189 | 182 | 152 |
| Elongation (%) | 189 | 201 | 222 | 161 | 166 | 188 | 174 | 271 |
| Dry heat compression set (%) | 3.1 | 3.1 | 4.0 | 3.3 | 3.6 | 3.1 | 3.9 | 3.1 |
| Hysteresis loss (%) | 36.1 | 37.2 | 39.9 | 31.8 | 40.9 | 43.9 | 48.7 | 50.2 |

TABLE 3

| | Examples | | | | | |
|---|---|---|---|---|---|---|
| | 9 | 10 | 11 | 12 | 13 | 14 |
| Polyol E | 100 | 80 | 100 | — | — | — |
| Polyol F | — | 20 | — | 100 | — | — |
| Polyol G | — | — | — | — | 100 | — |
| Polyol H | — | — | — | — | — | 100 |
| Total unsaturation degree (meq/g) | 0.010 | 0.022 | 0.010 | 0.049 | 0.110 | 0.089 |
| Cross-linking agent | — | 10 | — | 10 | 10 | 10 |
| Blowing agent | 3.0 | 3.5 | 4.0 | 5.0 | 2.0 | 5.0 |
| Catalyst a | 0.7 | 0.7 | 1.0 | 0.3 | 0.7 | 0.7 |
| Catalyst b | 0.03 | 0.03 | 0.03 | 0.05 | 0.05 | 0.05 |
| Foam stabilizer c | 1.0 | 1.0 | 1.0 | 1.0 | 1.0 | 1.0 |
| Isocyanate compound | a | a | a | a | a | a |
| NCO index | 100 | 105 | 90 | 110 | 90 | 115 |
| Hard segment(%) | 40.8 | 40.3 | 41.9 | 38.4 | 17.0 | 36.2 |
| Glass transition point 1 (° C.) | 14 | −40.9 | 8 | −42.4 | −57.1 | −58.0 |
| Glass transition point 2 (° C.) | — | 10 | — | — | — | — |
| Moldability | ○ | ○ | ○ | Δ | ○ | ○ |
| Core density (kg/m$^3$) | 50.9 | 41.9 | 32.1 | 20.1 | 55.1 | 22.5 |
| 25% hardness (N/314 cm$^2$) | 103 | 166 | 177 | 180 | 143 | 174 |
| CLD hardness 1 (N/cm$^2$) | 0.245 | 0.391 | 0.411 | 0.561 | 0.421 | 0.539 |
| CLD hardness 2 (N/cm$^2$) | 29.10 | Unmeasurable | Unmeasurable | 0.581 | 0.446 | 0.565 |
| Hardness ratio | 118.8 | — | — | 1.04 | 1.06 | 1.05 |
| Core impact resilience 1 (%) | 17 | 21 | 14 | 30 | 33 | 37 |
| Core impact resilience 2 (%) | 8 | 10 | 5 | 26 | 29 | 31 |
| Tear strength (N/cm) | 3.2 | 3.5 | 3.5 | 3.1 | 3.4 | 4.5 |
| Tensile strength (kPa) | 79 | 94 | 82 | 100 | 89 | 103 |
| Elongation (%) | 88 | 95 | 88 | 130 | 150 | 148 |

TABLE 3-continued

| | Examples | | | | | |
|---|---|---|---|---|---|---|
| | 9 | 10 | 11 | 12 | 13 | 14 |
| Dry heat compression set (%) | 17.1 | 15.9 | 19.1 | 10.1 | 14.5 | 18.6 |
| Hysteresis loss (%) | 42.9 | 45.3 | 50.1 | 40.1 | 44.3 | 47.8 |

TABLE 4

| | Examples | | | | | | |
|---|---|---|---|---|---|---|---|
| | 15 | 16 | 17 | 18 | 19 | 20 | 21 |
| Polyol A | 60 | 60 | 70 | 70 | — | — | — |
| Polyol B | — | — | — | — | 60 | 60 | 70 |
| Polyol C | — | 10 | — | — | — | 10 | — |
| Polyol D | 20 | 10 | — | — | 20 | 10 | — |
| Polyol E | 20 | 20 | 30 | 30 | 20 | 20 | 30 |
| Total unsaturation degree (meq/g) | 0.027 | 0.029 | 0.028 | 0.028 | 0.028 | 0.031 | 0.037 |
| Cross-linking agent | 10 | 10 | 10 | 10 | 10 | 10 | 10 |
| Blowing agent | 1.5 | 1.5 | 1.5 | 1.5 | 2.5 | 2.5 | 2.5 |
| Catalyst a | 1.0 | 1.0 | 1.0 | 1.0 | 1.0 | 1.0 | 1.0 |
| Catalyst b | 0.08 | 0.08 | 0.08 | 0.08 | 0.1 | 0.1 | 0.1 |
| Foam stabilizer a | 0.2 | 0.2 | — | — | 0.2 | 0.2 | — |
| Foam stabilizer b | 1.0 | 1.0 | 1.2 | 1.2 | 1.0 | 1.0 | 1.2 |
| Isocyanate compound | a | a | b | c | a | a | b |
| NCO index | 80 | 80 | 80 | 80 | 80 | 80 | 80 |
| Hard segment(%) | 19.2 | 18.3 | 19.5 | 19.1 | 24.5 | 23.7 | 25.0 |
| Glass transition point 1 (° C.) | −61.1 | −65.5 | −63.4 | −63.4 | −65.1 | −64.2 | −63.5 |
| Glass transition point 2 (° C.) | −15.2 | −13.5 | −7.2 | −8.9 | −17.0 | −15.3 | −9.9 |
| Moldability | ○ | ○ | ○ | ○ | ○ | ○ | ○ |
| Core density (kg/m$^3$) | 70.3 | 73.2 | 72.1 | 70.1 | 60.3 | 61.0 | 63.2 |
| 25% hardness (N/314 cm$^2$) | 64 | 79 | 60 | 71 | 93 | 88 | 79 |
| CLD hardness 1 (N/cm$^2$) | 0.191 | 0.235 | 0.193 | 0.228 | 0.278 | 0.263 | 0.229 |
| CLD hardness 2 (N/cm$^2$) | 0.235 | 0.267 | 0.249 | 0.258 | 0.325 | 0.297 | 0.252 |
| Hardness ratio | 1.23 | 1.14 | 1.29 | 1.10 | 1.17 | 1.13 | 1.10 |
| Core impact resilience 1 (%) | 2 | 2 | 3 | 2 | 3 | 2 | 2 |
| Core impact resilience 2 (%) | 1 | 1 | 1 | 1 | 1 | 1 | 2 |
| Tear strength (N/cm) | 6.7 | 6.2 | 7.2 | 7.0 | 6.2 | 6.2 | 6.5 |
| Tensile strength (kPa) | 153 | 149 | 173 | 213 | 189 | 172 | 195 |
| Elongation (%) | 207 | 224 | 211 | 211 | 161 | 178 | 194 |
| Dry heat compression set (%) | 4.0 | 3.2 | 3.9 | 3.3 | 3.6 | 4.1 | 3.9 |
| Hysteresis loss (%) | 49.5 | 43.5 | 47.3 | 51.8 | 40.9 | 47.9 | 49.7 |

TABLE 5

| | Examples | | | | | |
|---|---|---|---|---|---|---|
| | 22 | 23 | 24 | 25 | 26 | 27 |
| Polyol A | — | 70 | — | — | — | — |
| Polyol B | 70 | — | — | — | — | — |
| Polyol C | — | — | 100 | — | — | 20 |
| Polyol D | — | — | — | 100 | — | — |
| Polyol E | 30 | 30 | — | — | 100 | 80 |
| Total unsaturation degree (meq/g) | 0.037 | 0.028 | 0.049 | 0.020 | 0.010 | 0.018 |
| Cross-linking agent | 10 | — | — | — | — | — |
| Blowing agent | 2.5 | 1.5 | 5.0 | 2.0 | 2.0 | 2.0 |
| Catalyst a | 1.0 | 1.0 | 0.3 | 0.5 | 0.7 | 0.7 |
| Catalyst b | 0.1 | 0.08 | 0.50 | 0.35 | 0.05 | 0.05 |
| Foam stabilizer a | — | 0.2 | — | — | — | — |
| Foam stabilizer b | 1.2 | 1.0 | — | — | — | — |
| Foam stabilizer c | — | — | 1.0 | 0.8 | 0.8 | 1.0 |
| Isocyanate compound | c | a | a | a | a | a |
| NCO index | 80 | 80 | 110 | 110 | 90 | 90 |
| Hard segment(%) | 28.5 | 18.5 | 40.4 | 34.2 | 25.6 | 32.3 |
| Glass transition point 1 (° C.) | −63.0 | −63.4 | −41.5 | −32.1 | −4.0 | −30.1 |
| Glass transition point 2 (° C.) | −10.7 | −8.9 | — | — | — | 5.1 |
| Moldability | ○ | ○ | ○ | Δ | Δ | ○ |
| Core density (kg/m$^3$) | 61.4 | 70.2 | 20.1 | 55.1 | 22.5 | 50.9 |
| 25% hardness (N/314 cm$^2$) | 77 | 69 | 180 | 143 | 174 | 103 |

TABLE 5-continued

| | Examples | | | | | |
|---|---|---|---|---|---|---|
| | 22 | 23 | 24 | 25 | 26 | 27 |
| CLD hardness 1(N/cm$^2$) | 0.230 | 0.200 | 0.510 | 0.400 | 0.493 | 0.314 |
| CLD hardness 2(N/cm$^2$) | 0.260 | 0.242 | 0.512 | 0.420 | 2.950 | 1.383 |
| Hardness ratio | 1.13 | 1.21 | 1.00 | 1.05 | 5.98 | 4.50 |
| Core impact resilience 1 (%) | 1 | 3 | 26 | 29 | 5 | 8 |
| Core impact resilience 2 (%) | 1 | 2 | 30 | 33 | 10 | 17 |
| Tear strength (N/cm) | 6.1 | 6.1 | 3.1 | 3.4 | 4.5 | 3.2 |
| Tensile strength (kPa) | 187 | 150 | 100 | 89 | 103 | 79 |
| Elongation (%) | 190 | 240 | 130 | 150 | 148 | 88 |
| Dry heat compression set (%) | 4.1 | 4.1 | 10.1 | 14.5 | 18.6 | 17.1 |
| Hysteresis loss (%) | 53.2 | 54.1 | 40.1 | 44.3 | 47.8 | 42.9 |

From the results shown in Tables 2 to 5, it is evident that the flexible foams of Examples 1 to 8 and 15 to 23 produced by using the specific polyol (1), have glass transition points within a range of from −80° C. to −60° C. Further, at the same time, the impact resilience is at most 30% irrespective of the temperature for measurement, and the hardness change due to a temperature is also little. Further, they are excellent in the mechanical properties such as the tear strength, the tensile strength and the elongation. Further, the dry heat compression set as an index of the durability is as small as at most 5%, whereby the durability is good. Particularly, the flexible foams of Examples 15 to 23 produced by using a mixture of the polyol (1) and the polyol (2) have shown a very low impact resilience.

On the other hand, in a case where the polyol (1) was not used (Examples 9 to 14 and 24 to 27), the compression set is as large as at least 10%, whereby the durability is poor. Some of these Examples show the physical properties equal to Examples of the present invention, but they have a problem such that the hardness ratio is large (the hardness change due to a temperature change is large) or the moldability is insufficient.

INDUSTRIAL APPLICABILITY

It is known that a low resilience flexible foam can usually be obtained if the hard segment content is raised. However, in such a case, the flexibility of the foam will be impaired. In the present invention, by using a polyol having a high-molecular weight, and particularly, by using a polyol having a high-molecular weight provided with an oxyalkylene random chain, a flexible foam having a low hard segment content, which is excellent in flexibility and has a low resilience, can be obtained. Namely, according to the present invention, it is possible to obtain a flexible polyurethane foam, which is excellent in durability and whereby the excellent low resilience is obtainable without using a plasticizer, and the hardness change due to a temperature change is little.

The entire disclosures of Japanese Patent Application No. 2001-388952 filed on Dec. 21, 2001 and Japanese Patent Application No. 2001-392354 filed on Dec. 25, 2001 including specifications, claims and summaries are incorporated herein by reference in their entireties.

What is claimed is:

1. A flexible polyurethane foam, having a core impact resilience of at most 3% as measured according to JIS K 6400 at 23° C. and glass transition points within ranges of from -80° C. to -60° C. and from -20° C. to lower than 0° C.;
   said polyurethane foam being obtained by reacting a polyol mixture with a polyisocyanate compound;
   wherein said polyol mixture comprises a polyol (1) having a hydroxyl value of from 5 to 15 mgKOH/g and a polyol (2) having a hydroxyl value of from 40 to 250 mgKOH/g and a number of functional groups of from 2 to 4; and
   wherein said polyol (1) has a oxyalkylene random chain having a content of oxyethylene groups of from 3 to 50 mass%, based on the oxyalkylene random chain.

2. A process for producing a flexible polyurethane foam, which comprises:
   reacting a polyol with a polyisocyanate compound in the presence of a urethanation catalyst, a foam stabilizer and a blowing agent, to produce said flexible polyurethane foam,
   wherein a polyol mixture is used which comprises a polyol (1) having a hydroxyl value of from 5 to 15 mgKOH/g and a polyol (2) having a hydroxyl value of from 40 to 250 mgKOH/g and a number of functional groups of from 2 to 4;
   wherein said polyol (1) has a oxyalkylene random chain having a content of oxyethylene groups of from 3 to 50 mass%, based on the oxyalkylene random chain; and
   wherein said flexible polyurethane foam has a core impact resilience of at most 3% as measured according to JIS K 6400 at 23° C. and glass transition points within ranges of from -80° C. to -60° C. and from -20° C. to lower than 0° C.

3. The process according to claim 2, wherein the polyol (1) is a polyoxyalkylene polyol obtained by ring-opening addition polymerization of an alkylene oxide in the presence of a double metal cyanide complex catalyst.

4. The process according to claim 3, wherein the polyol (1) is a polyoxyalkylene polyol having an oxyalkylene random-chain formed in the presence of a double metal cyanide complex catalyst.

5. The process according to claim 2, wherein the mixed mass ratio of the polyol (1) to the polyol (2) in said polyol mixture is from 50:50 to 75:25.

6. The flexible polyurethane foam according to claim 1, having a glass transition point of from -70° C. to -60° C.

7. The flexible polyurethane foam according to claim 1, having a glass transition point of from -10° C. to -5° C.

8. The flexible polyurethane foam according to claim 1, having a hard segment content of at most 40 mass% based on the total amount of polyurethane in said foam.

9. The method according to claim 2, in which no plasticizer is used.

10. The method according to claim 2, wherein said catalyst is an ether and/or alcohol complex containing zinc hexacyanocobaltate as the main component.

* * * * *